United States Patent
Covington

(10) Patent No.: US 8,824,107 B2
(45) Date of Patent: Sep. 2, 2014

(54) MAGNETIC ELEMENT WITH CURRENT CONSTRICTION FEATURE

(71) Applicant: Seagate Technology LLC, Cupertino, CA (US)

(72) Inventor: Mark William Covington, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/665,505

(22) Filed: Oct. 31, 2012

(65) Prior Publication Data

US 2014/0118862 A1 May 1, 2014

(51) Int. Cl.
*G11B 5/11* (2006.01)
*G11B 5/147* (2006.01)
*G11B 5/39* (2006.01)

(52) U.S. Cl.
USPC ............. 360/322; 360/319; 360/324.12

(58) Field of Classification Search
USPC ........... 360/319, 322, 125.3, 125.71, 128, 360/324.1, 324.11, 324.12, 324.2
See application file for complete search history.

(56) References Cited

U.S. PATENT DOCUMENTS

| | | | |
|---|---|---|---|
| 5,515,221 A | 5/1996 | Gill et al. | |
| 6,381,107 B1 | 4/2002 | Redon et al. | |
| 6,456,467 B1 | 9/2002 | Mao et al. | |
| 7,154,713 B2 * | 12/2006 | Watanabe et al. | 360/313 |
| 7,869,165 B2 * | 1/2011 | Miyauchi et al. | 360/319 |
| 8,089,734 B2 * | 1/2012 | Miyauchi et al. | 360/319 |
| 8,149,546 B2 | 4/2012 | Ayukawa et al. | |
| 8,284,525 B2 * | 10/2012 | Gill et al. | 360/319 |
| 8,289,660 B2 * | 10/2012 | Dimitrov et al. | 360/319 |
| 8,390,963 B2 * | 3/2013 | Dimitrov et al. | 360/319 |
| 2010/0027167 A1* | 2/2010 | Gill et al. | 360/319 |
| 2011/0228428 A1 | 9/2011 | Dimitrov et al. | |

* cited by examiner

*Primary Examiner* — Jefferson Evans
(74) *Attorney, Agent, or Firm* — Hall Estill Attorneys at Law

(57) ABSTRACT

A magnetic element may generally be directed to data bit sensing in various data storage environments. An example magnetic element may be configured with at least a magnetic stack contacting a magnetic shield having a current constriction feature configured to transition current from a horizontal orientation to a vertical orientation proximal an air bearing surface (ABS).

20 Claims, 4 Drawing Sheets

MAGNETIC ELEMENT WITH CURRENT CONSTRICTION FEATURE

SUMMARY

Various embodiments of the present disclosure are generally directed to a magnetic element that is capable of data sensing.

In accordance with some embodiments, a magnetic element may be configured with at least a magnetic stack contacting a magnetic shield having a current constriction feature configured to transition electrical current from a horizontal orientation to a vertical orientation proximal an air bearing surface (ABS).

DETAILED DESCRIPTION

As the data storage industry continues to strive for higher data capacity, faster data access times, and reduced form factors, smaller data storage components and tighter dimensional tolerances have become more prevalent. Such precise structural configurations can lead to quiescent state biasing instability and noise that inhibits data signal amplitude and efficient data access. The combination of strong magnetic flux and close physical proximity of data storage components can lead to erratic magnetic behavior that is not conducive to accurate and fast data sensing. As such, there is a continued industry demand for magnetic instability mitigation in reduced form factor, high data bit density storage devices.

Accordingly, a magnetic element may be configured with a magnetic stack contacting a magnetic shield having a current constriction feature configured to transition electrical current from a horizontal orientation to a vertical orientation proximal an air bearing surface (ABS). The ability to tune the current constriction feature to provide vertically oriented electrical current to a predetermined region of the magnetic stack proximal the ABS restricts the current from flowing to portions of the magnetic stack that can produce magnetic noise, erratic magnetic behavior, and poor responsiveness to media flux. The current constriction feature may further be tuned to provide additional space distal the ABS, which can allow for more robust magnetic and electrical isolation of data storage components.

Figure 1:
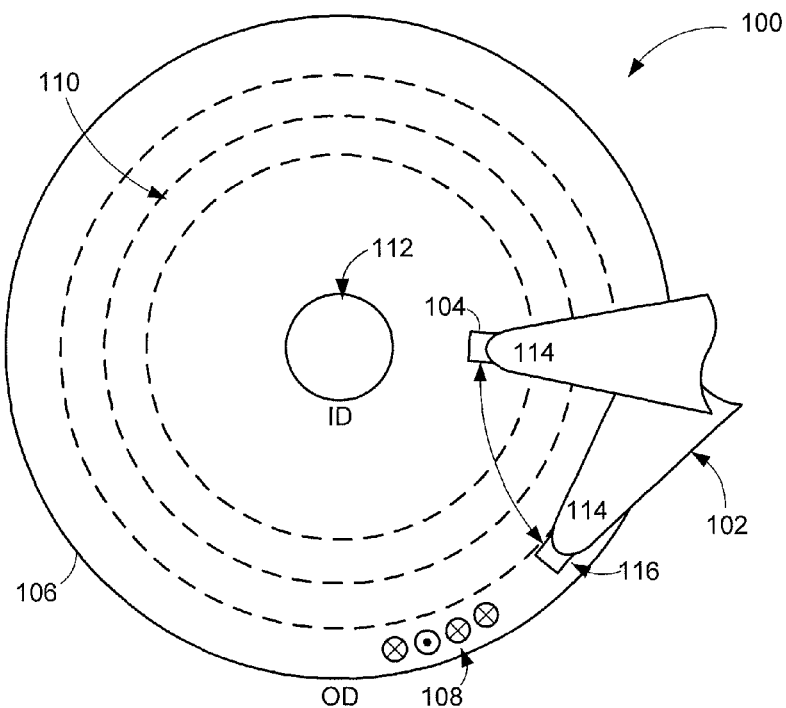
FIG. 1 is a block representation of an example portion of a data storage device.

While tuned current constriction features may be practiced in a variety of non-limiting environments, FIG. 1 generally illustrates atop view block representation of an example data storage device 100 that can utilize a tuned magnetic element in accordance with various embodiments. The data storage device 100 is shown in a non-limiting configuration where an actuating assembly 102 is capable of positioning a transducing head 104 over a variety of locations on a magnetic storage media 106 where stored data bits 108 are located on predetermined data tracks 110. The storage media 106 can be attached to one or more spindle motors 112 that rotate during use to produce an air bearing surface (ABS) on which a slider portion 114 of the actuating assembly 102 flies to position a head gimbal assembly (HGA) 116, which includes the transducing head 104, over a predetermined portion of the media 106.

The transducing head 104 can be configured with one or more transducing elements, such as a magnetic writer, magnetically responsive reader, and magnetic shields, which operate to program and read data from the selected data tracks 110 of the storage media 106, respectively. In this way, controlled motion of the actuating assembly 102 correspond with alignment of the transducers with the data tracks 110 defined on the storage media surfaces to write, read, and rewrite data.

As data bits 108 become more densely positioned in the data tracks 110, the head 104 may become unstable and provide erratic data signals as electrical current is inadvertently conducted through unwanted portions of the transducing regions of the head 104. That is, the physical size of the magnetically sensitive aspects of the head 104 may provide a number of electrical current paths through magnetically unstable or unresponsive non-optimized portions of a magnetic element. With such inadvertent behavior in mind, features can be built into a magnetic element that directs electrical current to predetermined regions that are magnetically optimized for efficient and accurate data access.

Throughout the present disclosure the term "stack" is meant as an unlimited term that can be one or more contacting magnetic and non-magnetic layers capable of magnetic shielding, reading, and writing. As such, the term "stack" will be understood to correspond to a component positioned on the ABS to conduct magnetic flux and electrical current in accordance with predetermined characteristics, such as providing a magnetoresistive effect, inducing a magnetic polarity onto an adjacent data storage media, and directing magnetic flux away from a data sensing region of a magnetic element.

Figure 2:
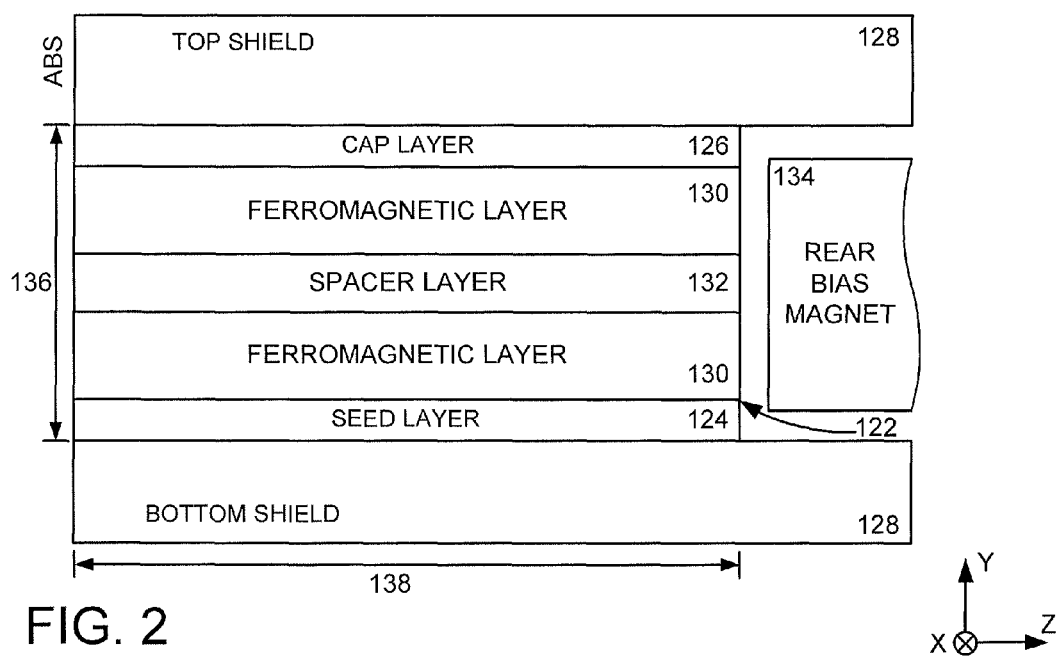
FIG. 2 provides a cross-sectional block representation of a portion of the data storage device displayed in FIG. 1.

FIG. 2 displays a cross-section block representation of an example magnetic element 120 capable of being used in the data storage device 100 of FIG. 1 and incorporating a tuned current constriction feature. The magnetic element 120 is shown as configured in accordance with some embodiments with a magnetic stack 122 disposed between seed 124 and cap 126 layers and magnetic shields 128 on an air bearing surface (ABS).

The magnetic stack 122 can be configured as a variety of different data bit sensing laminations, such as a magnetoresistive, tunnel magnetoresistive, and spin valve, but in the embodiment shown in FIG. 2 is constructed as a "trilayer" sensor with dual ferromagnetic free layers 130 separated by a non-magnetic spacer layer 132. The trilayer magnetic stack 122 can be characterized by the pair of magnetically sensitive ferromagnetic layers that are biased to a default magnetization by an adjacent, but physically separate, rear bias magnet 134 as opposed to contact with a fixed magnetization reference structure. That is, the magnetic stack 122 lacks any fixed magnetizations, which reduces the shield-to-shield spacing 136 and the magnetic stress on the vertical 128 and side shields.

The magnetic orientations of the free layers 130 may act to provide a measureable magnetoresistive effect when an external data bit is encountered as a predetermined default magnetization of one, or both free layers 130 is altered through a scissoring mechanism where the magnetization of the layers transition between quiescent and activated states. The size, placement, and magnetic coercivity of the rear bias magnet 134 may be tuned and configured to provide predetermined bias magnetization that acts in conjunction with anisotropy of the ferromagnetic free layers 130 to robustly set similar or dissimilar quiescent magnetizations in the free layers 130.

The use of the rear bias magnet 134 can be tuned with respect to the stripe height 138 of the magnetic stack 122, as measured from the ABS along the Z axis, and the anisotropy of the free layers 130 to allow precise magnetic operation of the free layer 130 magnetizations to sense data bits. However, larger bias magnet strength may correspond with stronger magnetic biasing to differentiate between densely packed data bits. The construction of a larger bias magnet may provide heightened data bit resolution, but can provide magnetic flux loss and magnetic instability as flux inadvertently passes to adjacent magnetic shields 128 instead of the magnetic stack 122.

Figure 3:
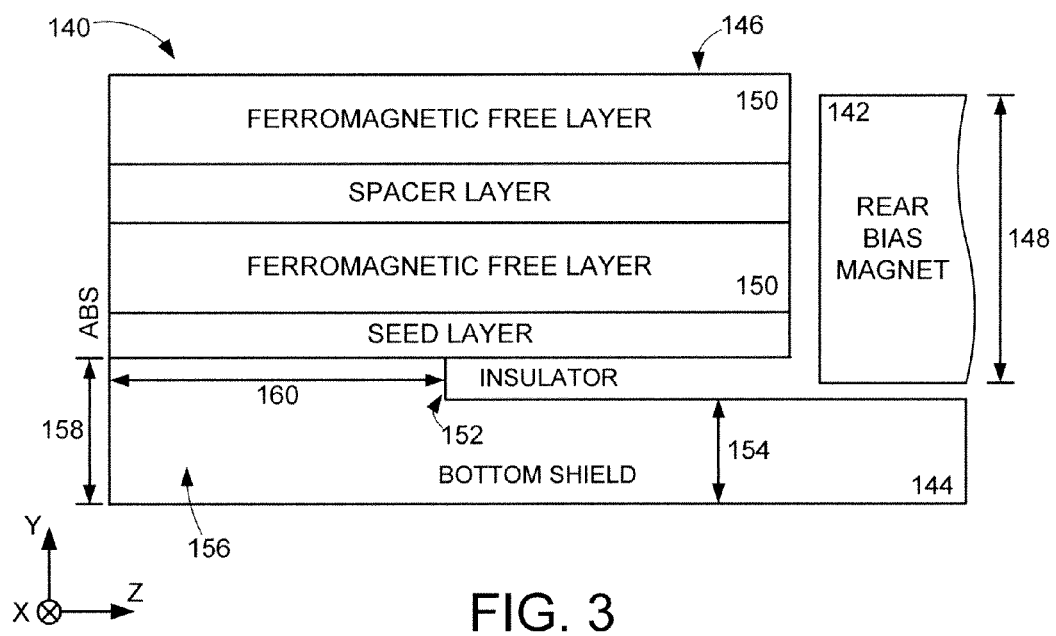
FIG. 3 shows a cross-sectional block representation of a portion of an example magnetic element constructed in accordance with various embodiments.

To illustrate how such bias magnetization may be mitigated, FIG. 3 shows a cross-sectional block representation of a portion of an example magnetic element 140 that generally illustrates how a rear bias magnet 142 can be tuned in relation to the configuration of the magnetic shields 144 and magnetic stack 146 in accordance with various embodiments. The rear bias magnet 142 can be configured with a magnetic coercivity that provides a remnant magnetization ($M_{PM}$) that creates a bias field that acts in concert with the anisotropy of the free layers 150 to set default magnetizations into the respective free layers 150. While a rectangular magnetic shield 144 shape can restrict the magnet thickness 148 that faces the rear surface of the free layers 150 of the magnetic stack 146, opposite the ABS, various embodiments position a transition region 152 in the magnetic shield 144 to provide an increased shield-to-shield spacing along a reduced thickness 154 portion as opposed to a smaller shield-to-shield spacing along an elevated thickness 156 portion of the magnetic shield 144.

The increase in shield-to-shield spacing provided by the reduced shield thickness 154 can allow for a larger bias magnet thickness 148 that extends beyond the bounds of the magnet stack 146 along the Y axis, parallel to the ABS, which can produce additional bias magnetization for the free layers 150. Tuning of the reduced shield thickness 152 by altering the shape and size of the transition region 152 can further provide physical space between the shield 144 and bias magnet 142 that can be filled with electrically and magnetically insulating materials to increase isolation of the rear bias magnet 142 and reduce the loss of biasing magnetization through the bottom shield 144.

While tuning the transition region 152 and rear bias magnet 142 can promote bias magnetization efficiently reaching the magnetic stack 146 instead of leaking to the shield 144, configuring the magnetic element 140 with increased insulation, bias magnet thickness 148, and shield-to-shield spacing can correspond with electrical current being restricted to flow only to portions of the free layers 150 configured to respond to adjacent data bits in predetermined manners, such as by scissoring, as opposed to unoptimized portions of the free layers 150 that may be unresponsive to data bits due to proximity to the rear bias magnet 142.

Figure 4:
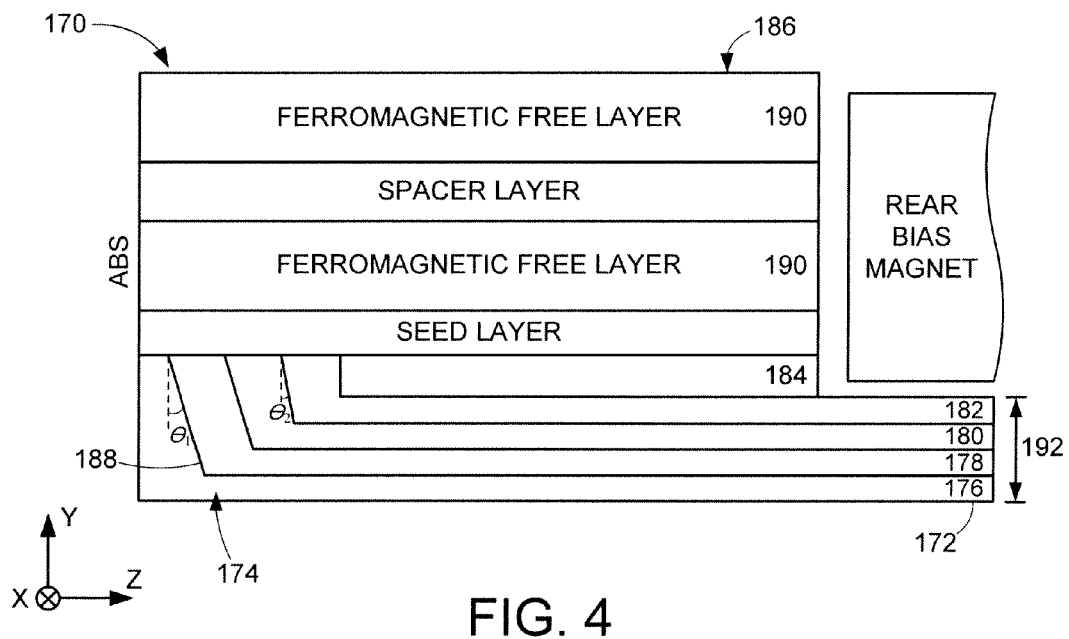
FIG. 4 displays a cross-sectional block representation of a portion of an example magnetic element constructed in accordance with some embodiments.

Configuring the bottom shield 144 with a constriction feature 156 tuned with predetermined thickness 158 at the ABS and stripe height 160 from the ABS allows for increased control of electrical current to regions of the magnetic stack 146 close to the ABS, but such tuned configuration may not translate to increased quiescent magnetic biasing and data read signal amplitude that accompanies high data bit density data storage environments as electrical current flows through inadvertent portions of the magnetic stack 146 resulting in erratic and weak data readback signal production. FIG. 4 provides a cross-sectional block representation of a portion of an example magnetic element 170 constructed in accordance with various embodiments to control electrical current flow and mitigate magnetic instability.

Through tuning the bottom magnetic shield 172 to provide a current constriction feature 174 proximal the ABS, numerous magnetic shield layers 176, 178, 180, 182, and 184 can be collectively or uniquely shaped to control electrical current flowing through the magnetic stack 186. The tuned configuration of constriction feature 174 can comprise, in some embodiments, the formation of shield sidewalls 188 angled at predetermined orientations $\square_1$ & $\square_2$ with respect to the ABS, which gradually focuses electrical current to predetermined portions of the magnetic stack 186. In the example embodiment shown in FIG. 4, the shield sidewalls 188 of the constriction feature 174 progressively decrease in angular orientation to provide a decreased width of each shield layer 176, 178, 180 and 182 at the interface between the shield 172 and the magnetic stack 186.

The tuning of the magnetic shield layers 176-184 with predetermined thicknesses that differ from at the constriction feature 174 as opposed to the portion of the shield 172 distal the ABS can serve to match electrical current ingress to the magnetic stack 186 with the magnetic configuration and operation of the free layers 190, but may also redirect electrical current from a horizontal orientation along the second thickness 192 to a vertical orientation at the current constriction feature 174 to provide electrical current that can more quickly and accurately sense data bits as shape anisotropy and the size of the current constriction feature 174 can rotate electrical current orientation to more efficiently pass through the magnetic stack 186 and provide higher amplitude data readback signals.

Figure 5:
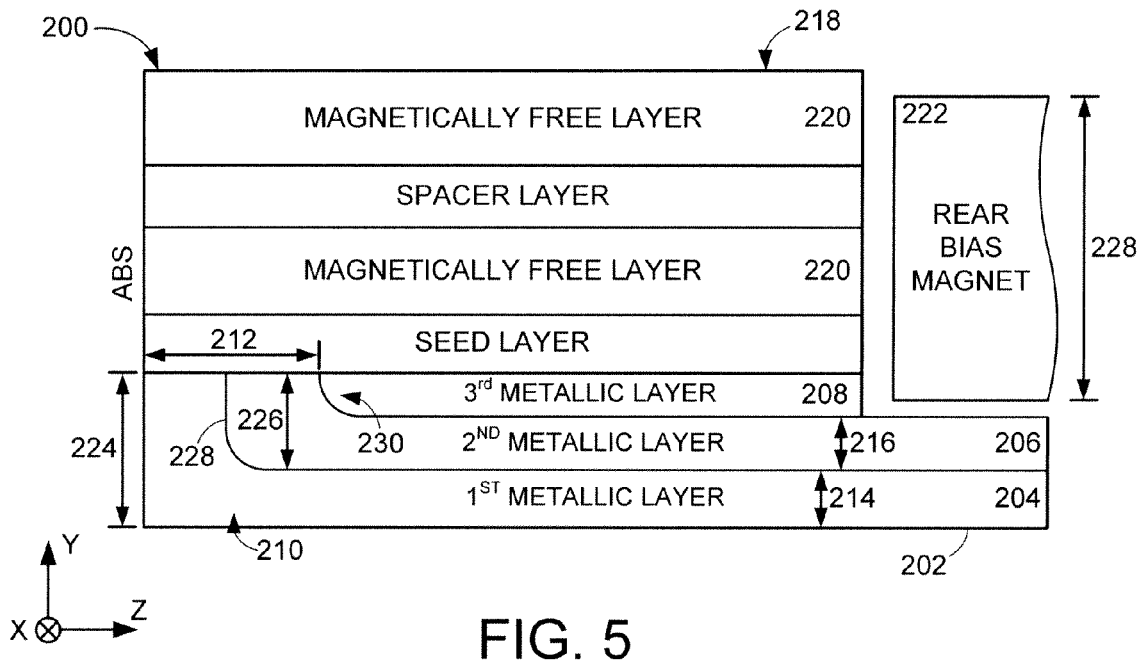
FIG. 5 is a cross-sectional block representation of a portion of an example magnetic element constructed in accordance with various embodiments.

While the sidewall 188 angular orientations, lengths, and magnetic layer thicknesses can be adjusted to control electrical current flow through the constriction feature 174, such tuned configurations may further control electrical current and current density by tuning the material composition of the various magnetic layers 176-184. FIG. 5 generally illustrates a portion of an example magnetic element 200 tuned in accordance with some embodiments to control electrical current density by configuring the bottom magnetic shield 202 as a lamination of layers 204, 206, and 208 respectively shaped to provide a current constriction feature 210 providing a predetermined width 212 proximal the ABS.

The magnetic shield 202 is tuned in various embodiments for material, number of layers, and respective layer thicknesses 214 and 216 to prevent the electrical current from flowing through the portions of the magnetic stack 218 where the magnetically free layers 220 are biased to magnetizations that are not conducive to efficient production of data readback signals, which can be due at least to the proximity to the rear bias magnet 222 and anisotropy of the respective free layers 220.

Tuning the magnetic shield 202 with multiple metallic ferromagnetic layers 204, 206, and 208 allows for electrical current density manipulation through the material composition of the respective shield layers, such as electrical resistivity. As a non-limiting example, the first metallic shield layer 204 can be constructed with a first thickness 214 and material that has a lower electrical resistivity than the different second thickness 216 and material of the second metallic shield layer 206. Such a shield 202 configuration can concentrate electrical current in the first metallic layer 204 with the lower resistivity, which further focuses electrical current towards the ABS.

The unlimited ability to tune the material and size of the metallic layers 204, 206, and 208 to control electrical current transmission can further entail shaping the current constriction feature 210 with varying vertical thicknesses 224 and 226 separated by a layer sidewall 228 oriented parallel to the ABS. The difference between thicknesses 224 and 226 and thicknesses 214 and 216 can translate electrical current to a vertical orientation at the predetermined width 212. The predetermined width 212 and current constriction feature 210 may also be tailored by shaping the transition regions 230 of each metallic shield layer 204, 206, 208, such as the continuously curvilinear transition shown in FIG. 5, the varying transitions of FIG. 4, and beveled transitions, to more efficiently redirect electrical current from a horizontal orientation along the Z axis to a vertical orientation at the predetermined width 212.

With the wide variety of tunable characteristics for the magnetic shield 202 and current constriction feature 210, electrical current density can be controlled to be uniform or non-uniform at the predetermined width 212 to provide a predetermined electrical current density for the magnetic stack 218 proximal the ABS. The tuned configuration of the magnetic shield 202 with a current constriction feature 210 and reduced shield-to-shield spacing distal the ABS may be complemented by a similarly or dissimilarly configured top shield, such as top shield of FIG. 2 that provides a predetermined electrical current width at the interface between the top shield and magnetic stack 218. For example, a top shield may be a single continuous layer that defines a current constriction feature with a transition region, much like the shield 144 of FIG. 3, while the bottom shield has multiple metallic layers like the shield 172 of FIG. 4.

Figure 6:
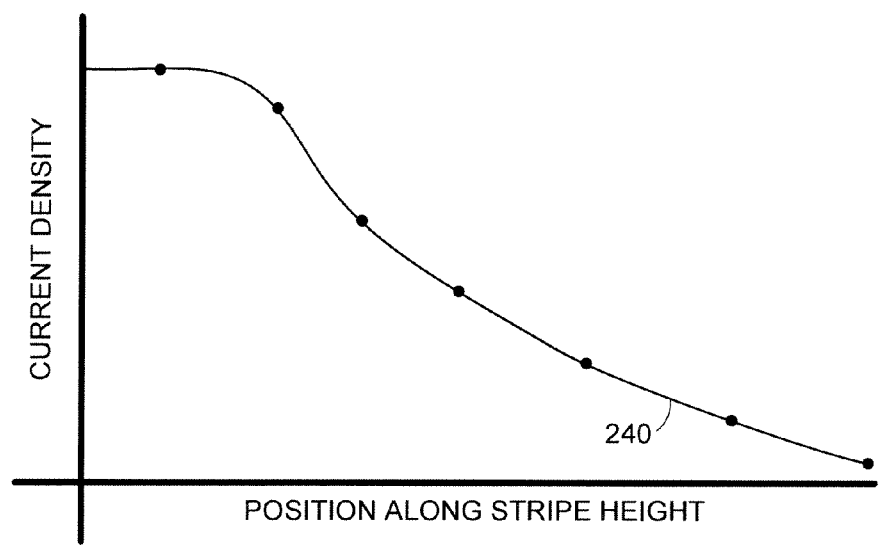
FIG. 6 plots operational data from an example magnetic element constructed and operated in accordance with some embodiments.

Regardless of the matching or dissimilar tuned configurations of the top and bottom shields of a magnetic element, the presence of one or more current constriction features can ensure electrical current passes through predetermined optimized portions of the magnetic stack 218 where heightened data signal and response to encountered data bits can be utilized. FIG. 6 graphs operational data from an example magnetic element tuned to provide a current constriction feature with predetermined electrical current density. Line 240 illustrates how electrical current density can be elevated proximal an ABS as a result of the shape, material, and variety of resistivity of the current constriction feature while limiting the proliferation of electrical current along the stripe height.

Figure 7:
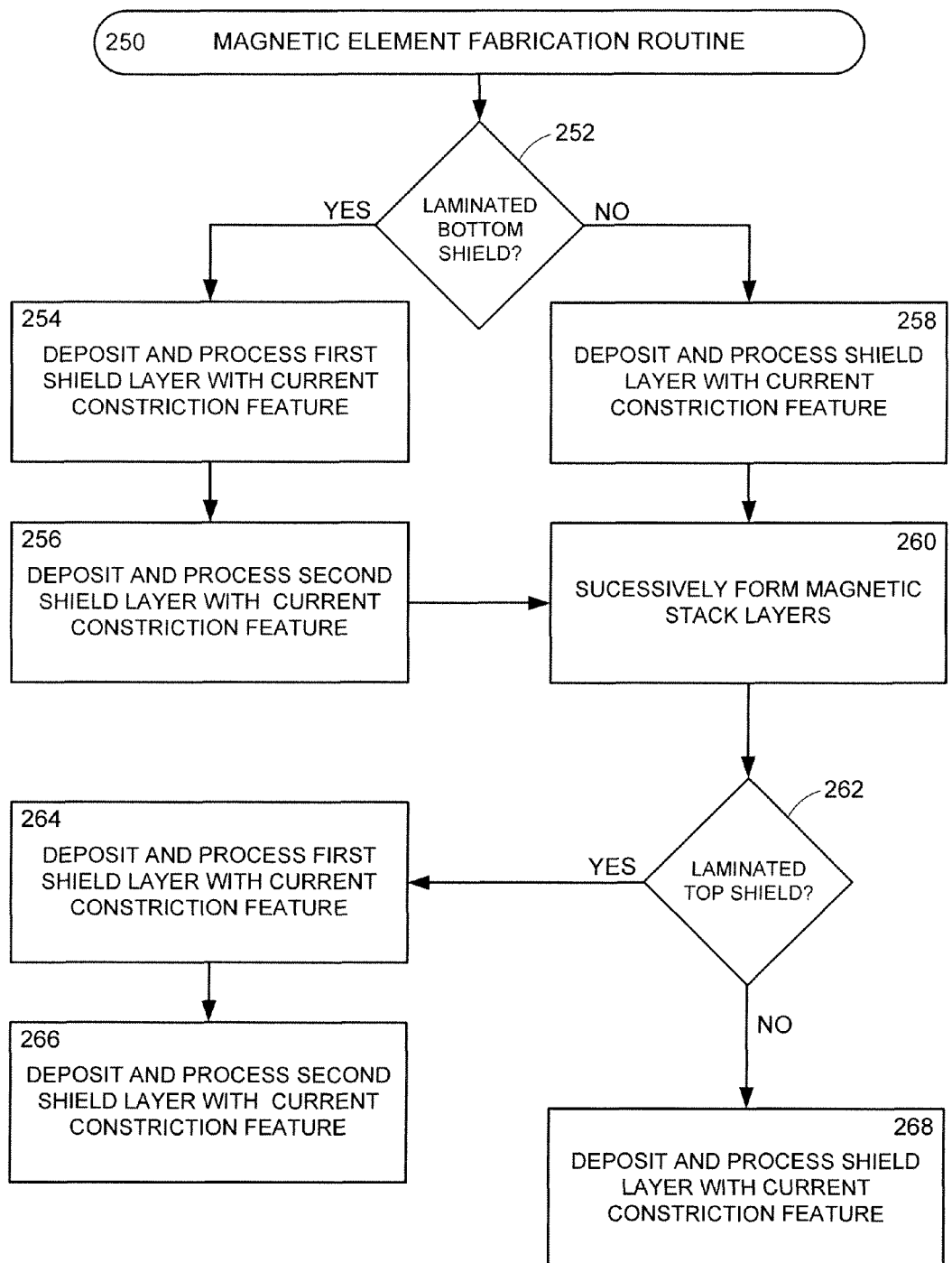
FIG. 7 provides a flowchart of a magnetic element fabrication routine conducted in accordance with various embodiments.

The mitigation of electrical current in portions of a magnetic stack distal the ABS allows the most magnetically sensitive portions of the magnetic stack to be serviced by electrical current to produce data signals with elevated amplitude and optimized stability. The variety of tunable characteristics allows a magnetic element to be catered to provide predetermined electrical current, magnetic biasing, and magnetic shield. FIG. 7 provides an example magnetic element fabrication routine 250 conducted to tune a magnet stack in accordance with various embodiments. Initially, decision 252 begins the routine 250 by determining the laminated or single layer construction of a bottom magnetic shield.

The choice of a laminated bottom shield in step 252 advances routine 250 to step 254 where a first shield layer is deposited and subsequently processed to provide a current constriction feature. Step 252 is not limited to a particular deposition method, such as oblique incidence sputtering, or post-deposition processing means, such as etching, to shape the first shield layer with a transition region that defines differing horizontal and vertical thicknesses and portions of the current constriction feature. Step 256 subsequently deposits and processes a second shield layer to complete the current constriction feature and provide a predetermined width proximal an ABS section of the magnetic shield.

If a continuous single layer bottom shield is chosen from decision 252, step 258 deposits and processes a single magnetic material with a reduced thickness cavity distal the ABS and a current constriction feature defined by a shaped transition region. Regardless of the number of layers in the bottom shield, step 260 follows the construction of the bottom current constriction feature by successively forming magnetic stack layers. Step 260 is not limited to a particular type of magnetic stack or stack layer deposition means, but in some embodiments is a trilayer stack with dual ferromagnetic layers and no fixed magnetization reference structure.

With the magnetic stack formed to contact the magnetic stack only at the predetermined width of the current constriction feature, decision 262 evaluates how a top magnetic shield is to be configured. Much like decision 252, but with no requirement to match the construction of the bottom shield, decision 262 may be configured as a lamination of multiple metallic layers that are deposited and processed in steps 264 and 266 or a single continuous layer that is deposited and processed in step 268. Through the construction of the various shield layers, a number of tuned characteristics, such as thickness, material, transition region shape, and predetermined width size can be adjusted to provide predetermined electrical current flow and density while allowing a rear bias magnet more shield-to-shield space to be larger and isolated from the shields by insulating material.

The various tunable characteristics of routine 250 may produce a variety of different current constriction features that can increase magnetic response and stability. However, the routine 250 is not limited as the various steps and decisions can be omitted, changed, and added. For instance, steps can be added to construct a rear bias magnet adjacent to and physically separated from the magnetic stack. As another non-limiting example, steps to add more than two shield layers on either, or both, the top and bottom magnetic shields may be added to routine 250.

The tuning of one or more magnetic shields to provide a current constriction feature can ensure electrical current with a predetermined electrical current density passes predominantly through an ABS portion of a magnetic stack to increase magnetoresistive sensing amplitude and stability. The tuned configuration of the current constriction feature can further provide increased shield-to-shield spacing distal the ABS to allow insulating material to focus biasing flux from a rear bias magnet to the magnetic stack without leaking to the magnetic shields. With such tuned magnetic behavior, a magnetic element can be more efficient and accurate, especially in reduced form factor, high data bit density data storage devices.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a magnetic stack having a first stripe height from an air bearing surface (ABS), the magnetic stack contacting a laminated magnetic shield having a current constriction feature configured with a second stripe height from the ABS and comprising multiple ferromagnetic layers separated by at least one sidewall oriented parallel to the ABS, the second stripe height being less than the first stripe height and the at least one sidewall is oriented to transition current from a horizontal orientation to a vertical orientation proximal the ABS.

2. The apparatus of claim 1, wherein the magnetic stack comprises first and second magnetically free layers without a fixed magnetization reference structure.

3. The apparatus of claim 2, wherein the first and second magnetically free layers are set to a default magnetization by a rear bias magnet positioned distal the ABS.

4. The apparatus of claim 3, wherein the rear bias magnet has a bias thickness greater than a stack thickness of the magnetic stack, as measured parallel to the ABS.

5. The apparatus of claim 1, wherein the magnetic shield has a third stripe height from the ABS that is greater than the first and second stripe heights, the magnetic shield contacts the magnetic stack only at the current constriction feature with a predetermined width of the third stripe height.

6. The apparatus of claim 1, wherein the magnetic shield comprises a reduced thickness distal the ABS defined by a transition region.

7. The apparatus of claim 6, wherein the transition region is configured with a continuously curvilinear shape.

8. The apparatus of claim 6, wherein the current constriction feature is configured with an elevated thickness greater than the reduced thickness.

9. The apparatus of claim 8, wherein the current constriction feature continuously extends from the ABS for the second stripe height.

10. The apparatus of claim 6, wherein the reduced thickness corresponds with the horizontal orientation of the electrical current.

11. The apparatus of claim 6, wherein an insulating material is disposed between the magnetic stack and the reduced thickness.

12. A magnetic element comprising a magnetic stack having a first stripe height from an air bearing surface (ABS), the magnetic stack contacting a laminated magnetic shield having a current constriction feature, the current constriction feature configured with a second stripe height from the ABS and comprising multiple metallic ferromagnetic layers separated by at least one sidewall oriented parallel to the ABS, the second stripe height being less than the first stripe height to transition current from a horizontal orientation to a vertical orientation proximal the ABS.

13. The magnetic element of claim 12, wherein the current constriction feature comprises at least one sidewall oriented parallel to the ABS and at least one sidewall angled with respect to the ABS.

14. The magnetic element of claim 13, wherein the first and second shield layers have different thicknesses.

15. The magnetic element of claim 13, wherein the first and second shield layers each has varying thicknesses, the first shield layer having a first thickness at the current constriction feature greater than a second thickness of the second shield layer at the current constriction feature.

16. The magnetic element of claim 13, wherein each shield layer comprises a transition region defining the current constriction feature proximal the ABS and reduced thickness region distal the ABS.

17. The magnetic element of claim 16, wherein a magnetically insulating layer separates the magnetic shield from the magnetic stack between the first and second stripe heights and a rear bias magnet along the reduced thickness region.

18. The magnetic element of claim 12, wherein the magnetic shield comprises first and second shield layers having different electrical resistivity.

19. A data sensor comprising:
 a magnetic stack having a first stripe height from an air bearing surface (ABS), the magnetic stack contacting a magnetic shield having a current constriction feature having a second stripe height from the ABS that is less than the first stripe height and multiple metallic ferromagnetic layers separated by at least one sidewall oriented parallel to the ABS; and
 means for transitioning electrical current from a horizontal orientation to a vertical orientation proximal the ABS.

20. The data sensor of claim 19, wherein the means for transitioning comprises altering the thickness of first and second metallic shield layers respectively with first and second transition regions.

* * * * *